United States Patent [19]

Naugle

[11] Patent Number: 5,715,393
[45] Date of Patent: Feb. 3, 1998

[54] METHOD FOR REMOTE SYSTEM PROCESS MONITORING

[75] Inventor: Raymond H. Naugle, Tempe, Ariz.

[73] Assignee: Motorola, Inc., Schaumburg, Ill.

[21] Appl. No.: 492,943

[22] Filed: Jun. 21, 1995

Related U.S. Application Data

[63] Continuation-in-part of Ser. No. 106,733, Aug. 16, 1993, abandoned.

[51] Int. Cl.$^6$ .................................................. G06F 15/00
[52] U.S. Cl. ........................... 395/200.11; 395/182.02
[58] Field of Search ....................... 395/200.11, 800, 395/700, 183.01, 185.01, 182.19, 183.06, 185.09, 183.17, 182.02

[56] References Cited

U.S. PATENT DOCUMENTS

| | | | |
|---|---|---|---|
| 5,230,051 | 7/1993 | Quan | 395/700 |
| 5,337,320 | 8/1994 | Kung | 371/15.1 |
| 5,369,570 | 11/1994 | Parad | 364/401 |
| 5,504,897 | 4/1996 | Gans et al. | 395/650 |
| 5,557,736 | 9/1996 | Hirosawa et al. | 395/182.02 |

OTHER PUBLICATIONS

Don Peacock et al., "Big Brother: A Network Services Expert," Summer USENIX "88, San Francisco, Jun. 20–24, pp. 393–398.

*Primary Examiner*—Mehmet B. Geckil
*Attorney, Agent, or Firm*—Robert D. Atkins

[57] ABSTRACT

A method for remote system monitoring which comprises two computer systems which operate independently but which are linked in such a way that they can exchange electronic mail with each other. An electronic mail message is sent between the computer systems which activates a monitoring program on the remote computer system. The monitoring program generates a status report which is returned to the monitoring computer by means of a second electronic mail message.

7 Claims, 1 Drawing Sheet

METHOD FOR REMOTE SYSTEM PROCESS MONITORING

This application is a continuation-in-part of prior application Ser. No. 08/106,733 filed Aug. 16, 1993, now abandoned.

BACKGROUND OF THE INVENTION

The present invention relates, in general, to monitoring the performance of computer systems, and more particularly to a method for monitoring correct operation of computers remotely.

A network of computers typically includes several hundred individual computer systems each operating independently of all of the others. As the physical size and cost of an individual computer system decreases, so does the availability of full time staff to monitor the operation of the systems. At the same time more and more reliability is placed on the computer system and its software. A computer system may control any of a variety of tasks which must be performed twenty-four hours a day, seven days a week. Typical tasks are security for a building, operation of machinery, and electronic mail handling. It is not sufficient to rely on the users of the system to identify and report problems, problems must be detected internally and reported to the person who can take corrective action without requiring intervention of other human beings.

According to the prior art, monitoring the operation of a remote computer has required dedicated network services, some form of custom-made alarm system, or remote logon to the system to check for its status. A method typical of the prior art is described in the article "Big Brother: A Network Services Expert" by Don Peacock et al. published at the Usenix 1988 Conference in San Francisco, Jun., 1988. This article describes a method for remote logon to a computer system which is configured such that remote logon from a master computer is performed automatically as frequently as monitoring is required. Once the remote system logs on to the target system, monitoring programs are run and error messages either recorded or alarms sounded to alert the operator of any problems. With the linking of many networks together network security becomes a major concern. Allowing automated logons to any computer which is connected to the network could also allow access by unauthorized personnel. In addition the logon procedure is different for different types and versions of computer software. Of necessity then this automated logon is a complex and custom designed procedure which must be reprogrammed for every computer system for which monitoring is desired.

There is a need for a method to monitor the correct operation of a remote computer system without requiring a logon to that system. The method should allow a limited set of commands which would verify the desired operation without compromising computer security. It is also desirable that all commands be usable on a wide variety of different computer systems. In addition a high degree of customization must be allowed so as to monitor the important functions of a wide variety of computer systems.

SUMMARY OF THE INVENTION

Briefly stated, the present invention provides a method for remote system monitoring which comprises two computer systems which operate independently but which are linked in such a way that they can exchange electronic mail with each other. An electronic mail message is sent between the computer systems which activates a monitoring program on the remote computer system. The monitoring program generates a status report which is returned to the monitoring computer by means of a second electronic mail message.

DETAILED DESCRIPTION OF THE DRAWINGS

Figure 1:
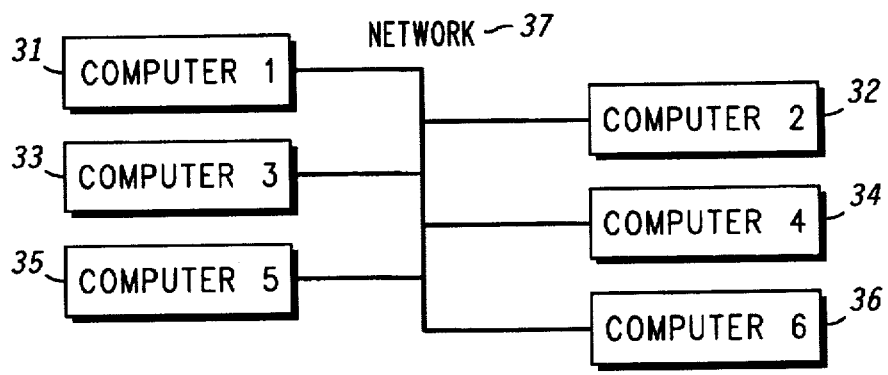
FIG. 1 is a block diagram of a computer network in accordance with a preferred embodiment of the present invention.

FIG. 1 is a block diagram of a network of computers 30 in accordance with the preferred embodiment of the invention. The computers 31, 32, 33, 34 35, 36 are connected in a network 37 using the TCP/IP network protocol. Although there are six computers shown connected to the network in FIG. 1, the number of computers in the network need not be a fixed number. Computers in the network may be added or removed as necessary. In the preferred embodiment, each computer in the network need not be of identical manufacture. Each computer in the network may be, for example, a Hewlett-Packard computer running the HPUX 9.x operating system, an IBM PowerPC computer running the AIX 3.2.5 operating system, or a Sun Microsystems computer running the SunOS 4.1.3 operating system. Note that the operating system on each of the mentioned computer is a version of the well-known UNIX operating system. The versions of the UNIX operating system provide the common software capability that are useful in computer to computer communication. Thus, the computers can communicate with each other regardless of who manufactures the computer. Also, each computer is linked to the network using the TCP/IP protocol, making each computer's hardware connection compatible with the other computers on the network. Therefore, with a common hardware connection and common software in the operating system each computer in the network can communicate with any other computer in the network.

Figure 2:
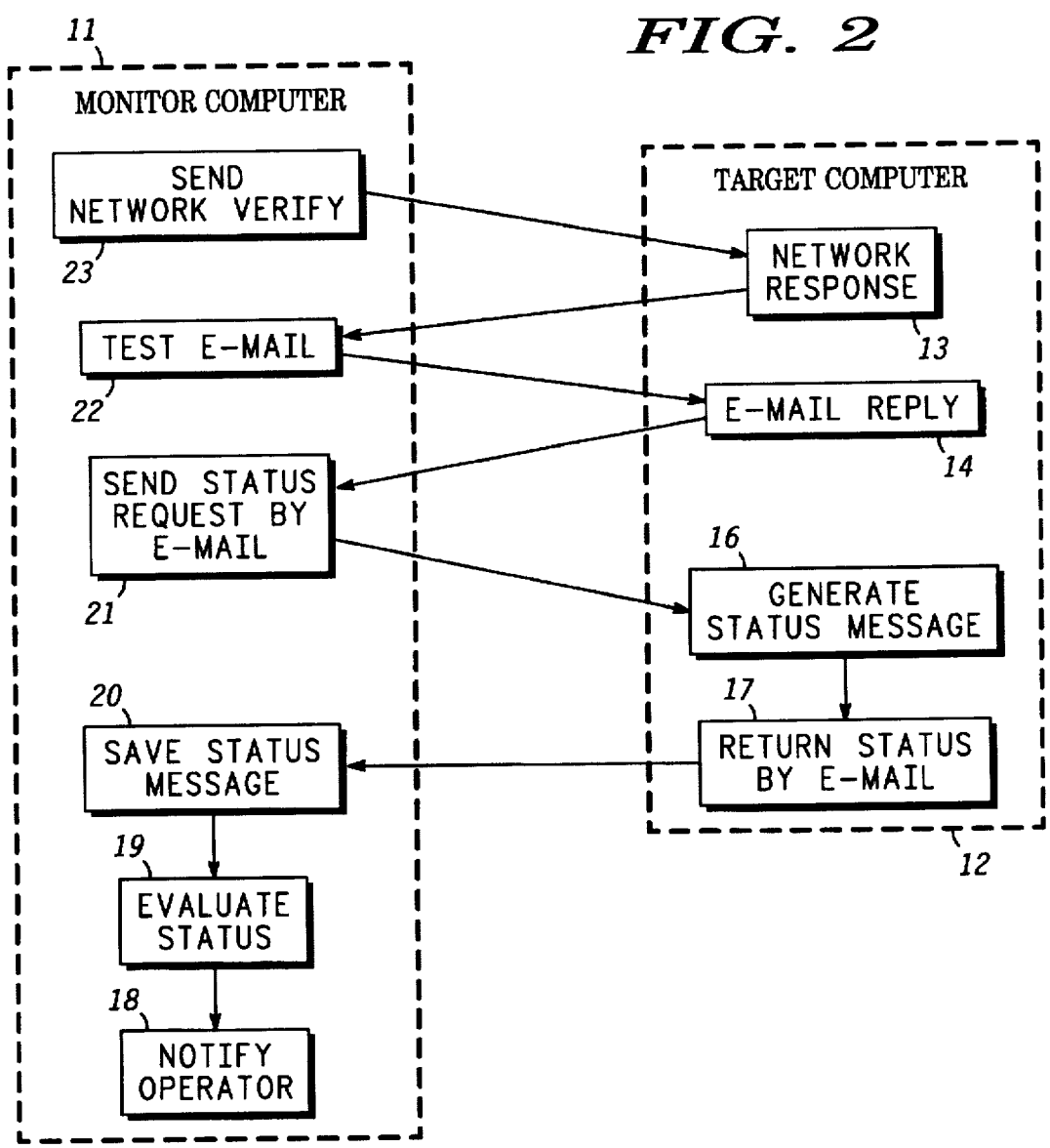
FIG. 2 is a flow diagram which illustrates the major steps of a method in accordance with a preferred embodiment of the present invention.

FIG. 2 is a flow diagram which illustrates the major steps of a method in accordance with a preferred embodiment of the present invention. A monitor computer 11 is linked to a target computer 12 by means of the network. One of the computer in the network of FIG. 1 is designated the monitor computer 11, and any of the other computers on the network will, in turn, become the target computer to be queried. The query sequence between the monitor computer and a particular target computer typically occurs at about 15 minutes intervals during time of heavy business activity such as Monday through Friday, and about one hour intervals during time of light business activity such as a weekend. At a predetermined time monitor computer 11 sends a network verify command in step 23 to a target computer 12. An example of the network verify command which is a UNIX System Command known as a "ping" command is shown below:

pelican.root 39#/usr/etc/ping monkey

In the above "ping" command, the identifier of the monitor computer is "pelican" and the identifier of the target computer is "monkey". The target computer 12 responds to the "ping" command from the monitor computer, if the hardware of the target computer is operational, with a network response in step 13 as follows:

monkey is alive

Typically, network verify command in step 23 and network response in step 13 are low level commands provided as part of the functionality of the computers' UNIX-like operating systems. This response serves to indicate that the network connection between monitor computer 11 and target computer 12 is operational and that the hardware of the target computer is actually running. Next a test of the electronic mail (email) capability of the target computer is performed in step 22 to ensure that email service in the target computer is operational. The email message from the monitor computer to a target computer to determine whether the email capability of the target computer is operational is shown below:

```
pelican.root 40# telnet monkey 25

Trying 192.1.1.1 . . .

Connected to monkey.

Escape character is '+e,cir +ee ]'.
```

The email capability utilized in the monitor computer and the target computers is the Sendmail software package which is standard software in the UNIX-like operating systems of the respective computers. A detail description of the "Sendmail" software is available in the handbook "Sendmail" written by Bryan Costales and published by O'Reilly and Associates. In the above example, the identifier of the monitor computer is "pelican, the identifier of the target computer is "monkey", and the number "25" designates that the Sendmail software is to be used to send the message. It is important to test the operation of email so that monitor computer 11 does not send multiple messages to a disabled computer. Such a condition causes a large number of messages to be queued for later delivery while waiting for target computer 12 to become operational. These queued messages can cause network congestion and can even delay or inhibit restart of target computer 12 if the volume of queued messages is sufficiently large. Accordingly, if email is not operational, monitor computer 11 sends no more messages but takes the appropriate corrective action such as notifying an operator. If email is operational, an email reply message in step 14 is generated by remote system 12 as shown below:

```
220 monkey.sps.mot.com Sendmail 4.1/SMI-4.1 ready at Tue, 16
   May 95 13:03:40 MST
```

Upon receiving email reply message, step 14, from the target computer 12, monitor computer 11 generates a custom status request message which is sent 21 to target computer 12 by electronic mail as shown below:

```
From: root@pelican.sps.mot.com (Mr. Pelican)

To: mbounce@monkey

Please-Return-To: bouncefile@pelican.sps.mot.com

Host: monkey
```

The message from the monitor computer is directed to software module "mbounce" of the target computer as shown above. In this message the designation of "25" for the "Sendmail" software is not necessary since both the Monitor and the target computers are already in email mode. The "mbounce" software module gathers the status of the target computer and formats them into a file for the monitor computer. Receipt of this special message causes a status program, "mbounce", to be run on target computer 12 to generate a status file in step 16 to be sent to the monitor computer. The monitor computer email message specifies that the status file in step 16 generated by the target computer is to be sent to a file called "bouncefile" of the monitor computer as shown in the third line of the above email message from monitor computer.

An example of a status message in step 16 from the target computer is as follows:

```
From: daemon@monkey.sps.mot.com
To: bouncefile@pelican.sps.mot.com
From root@pelican.sps.mot.com Tue May 16 13:45:20 1995
Received: by pelican (4.1/SMI-4.1/Email-2.1)
      id AA07088 for mbounce@monkey ; Tue, 16 May 95 13:45:19 MST
Date: Tue, 16 May 95 13:45:19 MST
From: root@pelican.sps.mot.com (Mr. Pelican)
To: mbounce@monkey.sps.mot.com
Please-Return-To: bouncefile@pelican.sps.mot.com
Host: monkey
```

| USER | PID | %CPU | %MEM | SZ | RSS | TT | STAT | START | TIME | COMMAND |
|---|---|---|---|---|---|---|---|---|---|---|
| daemon | 25521 | 7.7 | 1.7 | 44 | 244 | ? | S | 13:45 | 0:00 | /usr/local/xlate/bin/mbounce |
| root | 25517 | 3.9 | 3.0 | 224 | 432 | ? | S | 13:45 | 0:00 | -AA19446 To az49law1.sps.mot.com (sendmail) |
| root | 2 | 0.0 | 0.0 | 0 | 0 | ? | D | 08:04 | 0:02 | pagedaemon |
| root | 73 | 0.0 | 0.0 | 16 | 0 | ? | I | 08:05 | 0:00 | (biod) |
| root | 54 | 0.0 | 0.0 | 56 | 0 | ? | IW | 08:05 | 0:03 | portmap |
| root | 184 | 0.0 | 0.0 | 56 | 0 | ? | IW | 08:05 | 0:00 | inetd |
| root | 58 | 0.0 | 0.0 | 40 | 0 | ? | IW | 08:05 | 0:00 | keyserv |
| root | 431 | 0.0 | 0.3 | 44 | 44 | ? | S | 08:08 | 0:17 | in.telnetd |
| root | 67 | 0.0 | 1.3 | 132 | 180 | ? | S | 08:05 | 1:22 | in.routed |
| root | 1 | 0.0 | 0.2 | 52 | 24 | ? | S | 08:04 | 0:10 | /sbin/init - |
| root | 105 | 0.0 | 0.0 | 84 | 0 | ? | IW | 08:05 | 0:00 | rpc.lockd |
| root | 74 | 0.0 | 0.0 | 16 | 0 | ? | I | 08:05 | 0:00 | (biod) |
| root | 75 | 0.0 | 0.0 | 16 | 0 | ? | I | 08:05 | 0:00 | (biod) |
| root | 76 | 0.0 | 0.0 | 16 | 0 | ? | I | 08:05 | 0:00 | (biod) |
| root | 87 | 0.0 | 0.7 | 60 | 104 | ? | S | 08:05 | 1:13 | syslogd |
| root | 99 | 0.0 | 0.7 | 160 | 100 | ? | S | 08:05 | 0:27 | /usr/lib/sendmail -bd -q4m |
| root | 175 | 0.0 | 0.0 | 56 | 0 | ? | IW | 08:05 | 0:00 | cron |
| root | 187 | 0.0 | 0.0 | 52 | 0 | ? | IW | 08:05 | 0:00 | /usr/lib/lpd |

-continued

| | | | | | | | | | |
|---|---|---|---|---|---|---|---|---|---|
| root | 70 | 0.0 | 5.5 | 4468 | 792 | ? | S | 08:05 | 6:09 in.named |
| root | 104 | 0.0 | 0.0 | 52 | 0 | ? | IW | 08:05 | 0:00 rpc.statd |
| root | 189 | 0.0 | 1.5 | 48 | 216 | ? | S | 08:05 | 0:16 rpc.rstatd |
| root | 172 | 0.0 | 0.1 | 12 | 8 | ? | S | 08:05 | 1:56 update |
| daemon | 25524 | 0.0 | 3.1 | 216 | 448 | ? | R | 13:45 | 0:00 /bin/ps auxwww |
| root | 196 | 0.0 | 0.0 | 40 | 0 | co | IW | 08:05 | 0:00 - cons8 console |
| (getty) | | | | | | | | | |
| root | 25497 | 0.0 | 0.0 | 212 | 0 | ? | IW | 13:44 | 0:00 -AA25488 To |
| palm.sps.mot.com (sendmail) | | | | | | | | | |
| root | 25519 | 0.0 | 2.6 | 232 | 368 | ? | S | 13:45 | 0:00 -AA25516 From |
| pelican.sps.mot.com: DATA (sendmail) | | | | | | | | | |
| daemon | 25520 | 0.0 | 0.8 | 24 | 108 | ? | S | 13:45 | 0:00 sh -c |
| /usr/local/xlate/bin/mbounce | | | | | | | | | |
| daemon | 25522 | 0.0 | 0.8 | 24 | 108 | ? | S | 13:45 | 0:00 sh -c (/bin/ps |
| auxwww ; /bin/df) > /tmp/pslog | | | | | | | | | |
| daemon | 25523 | 0.0 | 0.6 | 24 | 80 | ? | S | 13:45 | 0:00 sh -c (/bin/ps |
| auxwww ; /bin/df) > /tmp/pslog | | | | | | | | | |
| root | 0 | 0.0 | 0.0 | 0 | 0 | ? | D | 08:04 | 0:03 swapper |
| Filesystem | | kbytes | | used | | avail | | capacity | Mounted on |
| /dev/sd3a | | 14431 | | 4086 | | 8902 | | 31% | / |
| /dev/sd3g | | 201043 | | 160908 | | 20031 | | 89% | /usr |
| /dev/sd3h | | 359155 | | 124847 | | 198393 | | 39% | /var |

The above status message is returned in step 17 by electronic mail from target computer 12 to monitor computer 11. The status message contains information such as the processes that are running, or scheduled to be run on the target computer and their memory utilization. The monitor computer 11 checks the returned status file in step 16 against a custom list of processes which are expected to be running on remote computer 12 and verifies other desired parameters such as disk space utilization. For instance, each line in the retuened status message having the word "root" denotes a process that is running on the target computer. The last column of each "root" line identifies the name of the process that is running, and is match against a list of processes in the monitor computer for the presence of a process. The lines below the line beginning with the word "Filesystem" indicate the disk utilization in the target computer. The column under "avail" indicates this disk space available in kilobytes. The disk availability is checked to see if it is below 5000. The column under capacity indicates the percentage of disk usage. The percentage of disk usage is checked to determine whether it is over 90%. This information is then saved in a log file. If no urgent error messages are noted then no further action is performed. If required, however, the status is evaluated in step 19 and the operator notified in step 18 to take corrective action. Typically, the notification process includes activating a call to a paging service which delivers a message to a pager held by the operator. The notification message identifies the host process and cause of failure to those receiving the monitor message. The monitor program also has a mechanism for problem escalation. If the failure is not resolved in a specified number of verification attempts, then another list of notifications to second and third tier operators can be sent as well.

By now it should be clear that the present invention provides a method to monitor the correct operation of a remote computer system without requiring a log on to that system. The method allows using a set of commands and software which are available in the operating systems of the computers in the network without extensive custom programming to verify the desired operation of the computers on the network without compromising computer security. All commands are usable on a wide variety of different computer systems which comprise heterogeneous systems.

I claim:

1. A method for remote monitoring of computers on a network using software capability of the computer operating system, comprising:

providing a monitor computer system;

providing a target computer linked to the monitoring computer;

sending a network verification command from the monitor computer system to the target computer system;

responding with a network verification code from the target computer system to the monitor computer system;

sending an email test message from the monitor computer system to the target computer system;

replying with an email verification message from the target computer system to the monitor computer system;

sending an email status request message from the monitor computer system to the target computer system;

locally analyzing the operation of the target computer system;

generating a status message by the target computer system, the status message comprising at least a summary of the analysis of the operation of the target computer;

replying with an email status message from the target computer system to the monitor computer system;

receiving the email status message by the monitor computer system; and comparing the contents of the status message with a predetermined list of conditions at the target computer system.

2. The method for remote monitoring of computers on a network of claim 1 further comprising:

evaluating the significance of discrepancies found during the step of comparing the contents of the email status message; and performing a predetermined task based on the results of the evaluation.

3. The method for remote monitoring of computers on a network of claim 2 wherein the predetermined task comprises automatically activating a remote paging device to signal an operator.

4. The method for remote monitoring of computers on a network of claim 2 wherein the predetermined task comprises automatically initiating a predetermined sequence of tasks on the target computer system.

5. The method for remote monitoring of computers on a network of claim 2 wherein the predetermined task comprises automatically alerting a predetermined list of people.

6. The method for remote monitoring of computers on a network of claim 1 wherein the predetermined list of conditions comprises a list of processes to be monitored and system resource utilization.

7. A method for remote monitoring of computers on a network using software capability of the computer operating system, comprising:

providing a monitor computer system;

providing a target computer system linked to the monitoring computer, wherein the monitor computer system and the target computer system comprise heterogeneous systems;

sending a network verification command from the monitor computer system to the target computer system;

responding with a network verification code from the target computer system to the monitor computer system;

sending an email test message from the monitor computer system to the target computer system;

replying with an email verification message from the target computer system to the monitor computer system;

sending an email status request message from the monitor computer system to the target computer system;

locally analyzing the operation of the target computer system;

generating a status message by the target computer system, the status message comprising at least a summary of the analysis of the operation of the target computer;

replying with an email status message from the target computer system to the monitor computer system;

receiving the email status message by the monitor computer system;

comparing the contents of the email status message with a list of processes to be monitored and current system resource utilization at the target computer system;

evaluating the significance of discrepancies found during the step of comparing the contents of the email status message; and automatically activating a remote paging device to signal an operator based on the results of the evaluation.

\* \* \* \* \*